United States Patent Office 3,271,366
Patented Sept. 6, 1966

3,271,366
PREPARATION OF AROMATIC
POLYIMINOLACTONES
John Anthony Kreuz, Tonawanda, N.Y., assignor to E. I. du Pont de Nemours and Company, Wilmington, Del., a corporation of Delaware
No Drawing. Filed Nov. 21, 1963, Ser. No. 325,441
2 Claims. (Cl. 260—47)

This invention relates the preparation of novel polymeric articles and coatings.

The polymeric articles and coatings consist essentially of polyisoimide or, more accurately, polyiminolactone[1]. Such polymers consist essentially of recurring units having the formula:

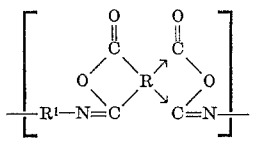

wherein the arrows denote isomerism[2];

R is an aromatic tetravalent organic radical; and
$R^1$ is arylene.

These polymers are prepared by treating a polyamide-acid with a compound from the group consisting of lower fatty acid halides, halogenated lower fatty acid halides, halogenated lower fatty acid anhydrides, aryl phosphonic dihalides and thionyl halides under conditions to form the polyiminolactone.

The polyiminolactone compositions may be used as such to form shaped articles, e.g., films, filaments, or they may, after shaping, be converted by heat or treatment with triethylammonium acetate to the corresponding polyimide or they may be converted to the corresponding polyamide-ester. Some representative uses of shaped articles of the polyiminolactone compositions follow. The composition may be used as an overwrap for a water-sensitive signal device for tracer work. The polyiminolactone covering, being of low hydrolytic stability, would decompose in water and, thus, expose the signal device for activation by the water. Because of its low hydrolytic stability and its thermal stability up to 300° C., the polyiminolactone as a film or filament could be used to sense small amounts of water in electric transformers and, thus, prevent them from burning out. This same combination of properties will permit the film to be used as a water-sensitive, thermally-stable relief valve. Since polyiminolactone will convert to polyimide directly at high temperature, the amount of conversion measured by infrared techniques may be used to determine temperatures. Since polyiminolactone displays intermediate resistivity ($10^{10}$–$10^{11}$ ohm-cm.), it may be used as an antistatic film where humidity is low, e.g., as a liner in conduits used for conveying dry, non-conducting materials that are sensitive to sparks (flour, hydrazine).

The polyamide-acid composition may be prepared by reacting at least one aromatic diamine having the structural formula $H_2N$—$R^1$—$NH_2$ with at least one tetracarboxylic acid dianhydride having the structural formula

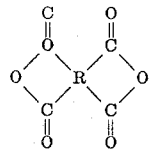

wherein R is a tetravalent aromatic radical and $R^1$ is arylene, in an organic solvent for at least one of the reactants, the solvent being inert to the reactants, preferably under anhydrous conditions, for a time and at a temperature sufficient to provide the polyamide-acid having recurring units of:

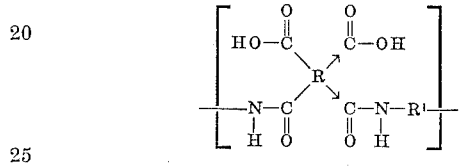

It should be understood that it is not necessary that the polymeric component of the composition be composed entirely of the polyamide-acid. This is particularly true since conversion to another polymer is contemplated subsequently.

Furthermore, in determining a specific time and a specific temperature for forming the polyamide-acid of a specified diamine and a specified dianhydride, several factors must be considered. The maximum permissible temperature will depend on the diamine used, the dianhydride used, the particular solvent, the percentage of polyamide-acid desired in the final composition and the minimum period of time that one desires for the reaction. For most combinations of diamines and dianhydrides falling within the definitions given above, it is possible to form compositions of 100% polyamide-acid by conducting the reaction below 100° C. However, temperatures up to 175° C. may be tolerated to provide acceptable compositions. The particular temperature below 175° C. that must not be exceeded for any particular combination of diamine, dianhydride, solvent and reaction time to provide a reaction product composed of the desired minimum of polyamide-acid will vary but can be determined by a simple test by any person of ordinary skill in the art. However, to obtain the maximum inherent viscosity, i.e., maximum degree of polymerization, for any particular combination of diamine, dianhydride, solvent, etc., and thus produce ultimately shaped articles such as films and filaments of optimum toughness, it has been found that the temperature throughout the reaction should be maintained below 60° C., preferably below 50° C.

The degree of polymerization of the polyamide-acid is subject to deliberate control. The use of equal molar amounts of the reactants under the prescribed conditions provides polyamide-acids of very high molecular weight. The use of either reactant in large excess limits the extent of polymerization. Besides using an excess of one reactant to limit the molecular weight of the polyamide-acid, a chain terminating agent such as phthalic anhydride may be used to "cap" the ends of the polymer chains.

In the preparation of the polyamide-acid, it is desired that the molecular weight be such that the inherent viscosity of the polymer is at least 0.1, preferably 0.3–5.0. The inherent viscosity is measured at 30° C. at a concentration of 0.5% by weight of the polymer in a suit-

---

[1] Anhydrides of acids in which the C=O groups are ortho give 5-imino-γ-lactones. Anhydrides of acids in which the C=O groups are peri give 6-imino-δ lactones.
[2] In any recurring unit the groups to which arrows point may exist as shown or in interchanged position.

able solvent, e.g., N,N-dimethylacetamide. To calculate inherent viscosity, the viscosity of the polymer solution is measured relative to that of the solvent alone.

$$\text{Inherent viscosity} = \frac{\text{natural logarithm} \frac{\text{Viscosity of solution}}{\text{Viscosity of solvent}}}{C}$$

where C is the concentration expressed in grams of polymer per 10 milliliters of solution. As known in the polymer art, inherent viscosity is directly related to the molecular weight of the polymer.

The quantity of organic solvent used in the process need only be sufficient to dissolve enough of one reactant, preferably the diamine, to initiate the reaction of the diamine and the dianhydride. It has been found that the most successful results are obtained when the solvent represents at least 60% of the final solution. That is, the solution should contain 0.05–40% of the polymeric component.

By use of the term "solution," whether it is a solution of the polyamide-acid or the polyaminolactone, it is meant to define a solid dissolved in a liquid and vice versa. These latter, liquids dissolved in solids, are commonly called gels. The gels may exist as homogeneous masses of liquid and solid in any form.

The starting materials for forming the polyamide-acids are aromatic diamines and aromatic tetracarboxylic acid dianhydrides. The organic diamines are characterized by the formula:

$$H_2N-R^1-NH_2$$

where $R^1$ is a divalent aromatic radical (arylene), preferably selected from the following groups: phenylene, naphthylene, biphenylene, anthrylene, furylene, benzfurylene and wherein $R^3$ is selected from the group consisting of an alkylene chain having 1–3 carbon atoms, $$-O-, -S-, -SO_2-, -\overset{O}{\underset{\|}{C}}-\overset{R^4}{\underset{|}{N}}-, -\overset{O}{\underset{\|}{C}}-O-, -\overset{R^4}{\underset{|}{N}}-, -\overset{R^4}{\underset{\underset{R^5}{|}}{Si}}-$$

$$-O-\overset{R^4}{\underset{\underset{R^5}{|}}{Si}}-O-, -\overset{R^4}{\underset{\underset{O}{\|}}{P}}-$$

and $$-O-\overset{R^4}{\underset{\underset{O}{\|}}{P}}-O-$$

wherein $R^4$ and $R^5$ are alkyl or aryl, and substituted groups thereof. Among the diamines which are suitable for use in the present invention are: meta-phenylene diamine; para-phenylene diamine; 2,2-bis(4-amino-phenyl) propane; 4,4'-diamino-diphenyl methane; 4,4'-diaminodiphenyl sulfide; 4,4'-diamino-diphenyl sulfone; 3,3'-diamino-diphenyl sulfone; 4,4'-diamino-diphenyl ether; 2,6-diamino-pryidine; bis-(4-amino-phenyl) diethyl silane; bis-(4-amino-phenyl) diphenyl silane; benzidine; 3,3'-dichloro-benzidine; 3,3'-dimethoxy benzidine; bis-(4-amino-phenyl) ethyl phosphine oxide; bis-(4-amino-phenyl) phenyl phosphine oxide; bis-(4-amino-phenyl)-N-butylamine; bis-(4-amino-phenyl)-N-methylamine; 1,5-diamino-naphthalene; 3,3'-dimethyl-4,4'-diaminobiphenyl; N-(3-aminophenyl)-4-aminobenzamide; 4-aminophenyl-3-aminobenzoate; and mixtures thereof.

The aromatic tetracarboxylic acid dianhydrides are characterized by the following formula:

wherein R is a tetravalent aromatic radical, e.g.

wherein $R^6$ is selected from the group consisting of $R^3$ and $$-\overset{O}{\underset{\|}{C}}-$$

In these dianhydrides every carbonyl group is attached directly to a separate carbon atom of the aromatic radical, the carbonyl groups being in pairs, the groups of each pair being adjacent to each other. Adjacent means ortho or peri, so that the dicarboxylanhydro rings are 5- or 6-membered, respectively.

The preferred aromatic dianhydrides are those in which the carbon atoms of each pair of carbonyl groups are directly attached to ortho carbon atoms in the R group to provide a 5-membered ring as follows:

$$\overset{\|}{C}-O-\overset{\|}{C}$$
$$-\overset{|}{C}\underline{\quad\quad}\overset{|}{C}-$$

or $$\overset{\|}{C}-O-\overset{\|}{C}$$
$$-\overset{|}{C}=\overset{|}{C}-$$

Illustrations of dianhydrides suitable for use in the present invention include:

pyromellitic dianhydride;
2,3,6,7-naphthalene tetracarboxylic dianhydride;
3,3',4,4'-diphenyl tetracarboxylic dianhydride;
1,2,5,6-naphthalene tetracarboxylic dianhydride;
2,2',3,3'-diphenyl tetracarboxylic dianhydride;
2,2-bis(3,4-dicarboxyphenyl) propane dianhydride;
bis(3,4-dicarboxyphenyl) sulfone dianhydride;
3,4,9,10-perylene tetracarboxylic dianhydride;
bis(3,4-dicarboxyphenyl) ether dianhydride;
naphthalene-1,2,4,5-tetracarboxylic dianhydride;
naphthalene-1,4,5,8-tetracarboxylic dianhydride;
2,6-dichloronaphthalene-1,4,5,8-tetracarboxylic dianhydride;
2,7-dichloronaphthalene-1,4,5,8-tetracarboxylic dianhydride;
2,3,6,7-tetrachloronaphthalene-1,4,5,8-tetracarboxylic dianhydride;
phenanthrene-1,8,9,10-tetracarboxylic dianhydride;
2,2-bis(2,3-dicarboxyphenyl) propane dianhydride;
1,1-bis(2,3-dicarboxyphenyl) ethane dianhydride;
1,1-bis(3,4-dicarboxyphenyl) ethane dianhydride;
bis(2,3-dicarboxyphenyl) methane dianhydride;
bis(3,4-dicarboxyphenyl) methane dianhydride;
bis(3,4-dicarboxyphenyl) sulfone dianhydride;

benzene-1,2,3,4-tetracarboxylic dianhydride;
3,4,3',4'-benzophenone tetracarboxylic dianhydride;
2,3,2',3'-benzophenone tetracarboxylic dianhydride;
2,3,3',4'-benzophenone tetracarboxylic dianhydride;
pyrazine-2,3,5,6-tetracarboxylic dianhydride;
thiophene-2,3,4,5-tetracarboxylic dianhydride; etc.

The inclusion of one or more diamines or dianhydrides other than those disclosed, e.g. aliphatic diamines or aliphatic dianhydrides, as reactants in the process may detract from one or more desirable properties of the polymeric products. However, the inclusion of such materials, to the extent that they do not detract substantially from the desirable results obtained with the aromatic rectants, is contemplated.

The solvents useful in the solution polymerization process for synthesizing the polyamide-acid compositions are the organic solvents whose functional groups do not react with either of the reactants (the diamines or the dianhydrides) to any appreciable extent. Besides being inert to the system, and preferably, being a solvent for the polyamide-acid, the organic solvent should be a solvent for at least one of the reactants, preferably for both of the reactants. To state it another way, the organic solvent is an organic liquid other than either reactant or homologs of the reactants that is a solvent for at least 1 reactant, and contains functional groups, the functional groups being groups other than monofunctional primary and secondary amino groups and other than the monofunctional dicarboxylanhydro groups. The normally liquid organic solvents of the N,N-dialkylcarboxylamide class are useful as solvents in the process. The preferred solvents are the lower molecular weight members of this class, particularly N,N-dimethylformamide and N,N-dimethylacetamide. They may easily be removed from the polyamide-acid and/or polymeric shaped articles by evaporation, displacement or diffusion. Other typical compounds of this useful class of solvents are: N,N-diethylformamide, N,N-diethylacetamide, N,N-dimethylmethoxy acetamide, N-methyl caprolactam, etc. Other solvents which may be used are: dimethylsulfoxide, N-methyl-2-pyrrolidone, tetramethyl urea, pyridine, dimethylsulfone, hexamethylphosphoramide, tetramethylene sulfone, formamide, N-methylformamide and butyrolactone. The solvents can be used alone, in combinations of solvents, or in combination with poor solvents such as benzene, benzonitrile, dioxane, xylene, toluene and cyclohexane.

In the next step, the polyamide-acid is converted to a polylactone having the formula:

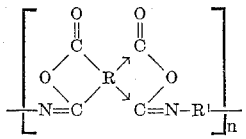

$n$ being an integer sufficiently high to provide an inherent viscosity at 30° C. of at least 0.1, preferably 0.3–5.0, as measured as a 0.5% solution in a suitable solvent (concentrated sulfuric acid, N,N-dimethylacetamide, etc.).

The method for converting to the polylactone involves the addition of one of the following cyclizing agents to the polyamide-acid solution: lower fatty acid halide, halogenated lower fatty acid halide, halogenated lower fatty acid anhydride, aryl phosphonic dihalide and thionyl halide. Representative cyclizing agents in this group include: acetyl chloride, bromide, iodide and fluoride; propionyl chloride, bromide, iodide and fluoride; isobutyryl chloride, bromide; n-butyryl chloride, bromide; valeryl chloride; mono-, di-, and tri-chloroacteyl chloride; bromoacetyl bromide; chloroacetic anhydride; trifluoroacetic anhydride; phenyl phosphonic dichloride; thionyl chloride, bromide, fluoride and chorofluoride. Some of the cyclizing agents operate successfully alone; e.g., trifluoroacetic anhydride. The others benefit by the coaction of a tertiary amine; and the cyclizing agent is usually added at room temperature (20–30° C.) along with the tertiary amine. The tertiary amine may be selected from the following: trimethylamine, triethylamine, tri-n-butylamine, N,N-dimethylethanolamine, N,N-dimethyldodecylamine, triethylenediamine, pyridine, the picolines, 2,6-lutidine, 2,4,6-collidine, quinoline, pyrazine and 2-methylpyrazine. Three particularly useful treatments for forming polylactones are: treatment of the polyamide-acid composition with chloroacetic anhydride and 2-methylpyrazine; with phenyl phosphonic dichloride and pyridine; and with trifluoroacetic anhydride alone.

As stated previously, the polyiminolactone compositions may be used as such to form shaped articles, e.g., films, filaments or they may, after shaping, be converted by heat or treatment with triethylammonium acetate to the corresponding polymide or they may be converted to the corresponding polyamide-ester, polyamide-amide or polytetrazole acid. Conversion to polyamide-ester is the subject of copending U.S. application Serial No. 325,497, filed November 21, 1963, by William E. Tatum and assigned to the assignee of the present application. In this process, the polylactone composition is treated with an alcohol or thiol to form the corresponding polyamide-ester or thioester. Conversion to polyamide-amide is the subject of copending U.S. application Serial No. 325,442, filed November 21, 1963, by R. J. Angelo and W. E. Tatum and assigned to the assignee of the present application. In this process, the polylactone composition is treated with ammonia, an amine or a diamine to form the corresponding polyamide-amide. Conversion to polytetrazole acid is the subject of copending U.S. application Serial No. 325,469, filed November 21, 1963, by William E. Tatum and Roger L. Thornton and assigned to the assignee of the present application. In this process, the polylactone composition is treated with hydrazoic acid to form the corresponding polytetrazole acid. These conversions may be carried out on a solution of the polylactone or on a shaped structure such as a film, filament, tube, etc. Where these polymeric compositions are obtained as solutions, they may be stored for later use or they may be immediately used to form shaped articles. Although they are useful as shaped articles, it is preferred to convert them to another polymer to modify the properties of the shaped structure. Thus, they may be converted by heat treatment to the corresponding polyimide, which has the following structural formula:

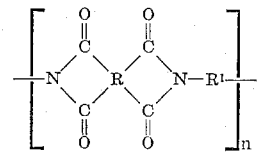

wherein
R is an aromatic tetravalent radical;
$R^1$ is arylene; and
$n$ is an integer sufficiently high to provide an inherent viscosity of at least 0.1, preferably 0.3–5.0, as measured as a 0.5% solution in a suitable solvent.

It has been found that in many cases, the polyamide-ester, polytetrazole acid and polyamide-amide articles can be converted to polyimed articles at very modest temperatures, thus tending to reduce any adverse effects of high temperature on the articles or materials that may have been incorporated into the articles.

Instead of being shaped itself or converted to another polymer, the polylactone with solvent can be used as a coating composition or as an adhesive layer, being converted in situ to the corresponding polyimide. The liquid composition containing the polymer, either alone or modified by the addition of fillers and/or foaming agents, may be applied by any of the usual techniques (doctoring, rolling, dipping, brushing, spraying) to a great variety of substrates. Such substrates include copper, brass, aluminum, steel, and other metals in the form of sheets, fibers, wires, screening; mineral structures such as asbestos; glass in the form of sheets, fibers, foams, fabrics, etc.; polymeric materials such as cellulosic materials (cellophane, wood, paper, etc.) polyolefins (polyethylene, polypropylene, polystyrene, etc.); polyesters (polyethylene terephthalate, etc.), polyamides, polyimides, perfluorocarbon polymers (polytetrafluoroethylene, copolymers of tetrafluoroethylene with hexafluoropropylene, etc.), polyurethanes, in the form of sheets, fibers, foams, woven and non-woven fabrics, screening, etc.; leather sheets; etc. The polymeric substrates can be metallized before coating, or treated with a conventional adhesive or other agent to improve surface receptivity. The same substrate materials may be used as top layers over the previously-coated substrates to provide laminates wherein the polymeric composition serves as an adhesive layer. Of course, the adhesive layer can be a preformed film of the polyiminolactone composition.

The invention will be more clearly understood by referring to the examples which follow, Example 1 representing the best mode contemplated for practicing the invention. It is understood that the examples, although illustrating specific embodiments of the present invention, should not be considered limitative of the invention.

The determination of the structure is accomplished by Infrared Spectral Techniques[3] known to those skilled in the art. The majority of the infrared spectra herein were taken on cast films by the use of a Perkin-Elmer Model 21 spectrophotometer and a Perkin-Elmer Infracord spectrophotometer.

Inherent viscosity, which is directly related to the molecular weight of the polymer, is defined by L. H. Cragg in the Journal of Colloid Science, volume I, pages 261–9 (May 1946), as:

$$\text{Inherent viscosity} = \frac{\ln \text{relative viscosity}}{C}$$

where relative viscosity is the ration of the solution viscosity to the solvent viscosity, and C is the concentration of solute in solution measured as grams of polymer per 100 ml. of solution.

*Examples 1–3*

A 6.5% by weight solution in N,N-dimethylacetamide of a polyamide-acid of pyromellitic dianhydride and 4,4′-diamino-diphenyl ether, the polymer having an inherent viscosity of 3.06 (as a 0.5% solution in N,N-dimethylacetamide at 30° C.), is cast into films with a 1.5 mil H-bar. The film samples are dried under vacuum in a nitrogen atmosphere for 24 hours. Their final thickness is about 0.15 mil. Each film is immersed for 20 hours at room temperature in a benzene solution containing a molar equivalent (based on the polymer) of each of the following cyclizing agents:

| Ex. | Cyclizing Agent | Catalyst | Results |
| --- | --- | --- | --- |
| 1 | Trifluoroacetic anhydride. | | Essentially all iminolactone; no n-imide absorption. |
| 2 | Phenyl phosphonic dichloride. | Pyridine. | Nearly all iminolactone. |
| 3 | Chloroacetic anhydride. | 2-methyl pyrazine. | Essentially all iminolactone; no n-imide absorption. |

Each film is heated for 72 hours at 50° C. The above results are measured by means of infrared spectra of the films. Absorptions at 5.62 and 13.80 and at 5.55 and 10.9 microns are attributed to n-imide and iminolactone, respectively. The relative amounts are estimated qualitatively.

*Example 4*

Equimolar amounts of pyromellitic dianhydride and 4,4′-diaminodiphenyl ether in about 9 parts by weight N,N-dimethylacetamide are agitated at 25–40° C. until polyamide-acid having an inherent viscosity of 2.98 (as a 0.5% solution in N,N-dimethylacetamide at 30° C.) is obtained. To 2.94 g. of this solution in a closed container is added 30 ml. of a 1 molar solution of trifluoroacetic anhydride in benzene. Cyclization of the polyamide-acid to poly(iminolactone) occurs very rapidly, giving a yellow gel.

*Example 5*

Acetyl chloride (1 ml.) is added at room temperature to 10 g. of a 10% by weight solution of the polyamide-acid of pyromellitic dianhydride and 4,4′-diamino-diphenyl ether in N,N-dimethylacetamide. After standing 26 hours the solution is cast into a thin film, which is dried at 50° C. and examined by infrared. The polymer contains a major amount of iminolactone.

*Examples 6–9*

The procedure of Example 5 is repeated, using instead of acetyl chloride each of the following cyclizing agents, at 1 molar concentration in a benzene solution also containing pyridine in equimolar concentration:

Ex. 6—propionyl fluoride
Ex. 7—valeryl chloride
Ex. 8—bromoacetyl bromide
Ex. 9—thionyl chloride The iminolactone content, as measured by infrared spectra, of each product is 67–70 mole percent.

*Example 10*

The polypyromellitamide-acid of 4,4′-diamino-diphenyl ether (2.94 g.) is slurried in tetrahydrofuran in a closed container. Then 30 ml. of a 1 molar solution of trifluoroacetic anhydride in benzene is added. After 10 minutes the slurry is filtered. The filtrate is taken to dryness by means of a stream of dry nitrogen. The yellow-orange solid thus obtained is dried to constant weight (1.80 g.) at room temperature in a vacuum oven under nitrogen at pressure considerably reduced below 1 atmosphere. The yield is 82.2% of theory. The infrared spectrum indicates substantially 100% iminolactone.

*Examples 11–15*

When a gel film of each of the following polyamide-acids is treated with trifluoroacetic anhydride as in Example 1, the polymer changes to the corresponding polyiminolactone:

Ex. 11—polyamide-acid of 3,4,3′,4′-benzophenonetetracarboxylic dianhydride and m-phenylenediamine;
Ex. 12—polyamide-acid of 2,2′,3,3′-diphenyl tetracarboxylic dianhydride and 4,4′-diaminodiphenyl ether;
Ex. 13—polyamide-acid of bis(3,4 - dicarboxyphenyl) ether dianhydride and 4,4′diaminodiphenyl sulfide;
Ex. 14—polyamide-acid of pyromellitic dianhydride and 4,4′diaminodiphenyl methane;
Ex. 15—polyamide-acid of pyromellitic dianhydride and 4,4′-diamino-diphenyl sulfone.

*Examples 16–17*

When Example 3 is repeated using in Example 16, pyridine, and in Example 17, triethylamine, instead of 2-methyl pyrazine, the results are substantially those obtained in Example 3.

*Examples 18–21*

Polyamide-acids are prepared by adding 1 molar equivalent of solid pyromellitic dianhydride in small proportions to a cooled, well-stirred solution (or suspension)

---

[3] W. M. D. Bryant and R. C. Voter, Journal of American Chemical Society, 75, 6113 (1953); and F. W. Billmeyer, "Textbook of Polymer Chemistry," chapter 7, Interscience Publishers, 1957.

in N,N-dimethylacetamide of each of the four diamines listed below:

| | Inherent viscosity [4] |
|---|---|
| 2,4-diamino cumene | 0.95 |
| p-Phenylenediamine | 2.90 |
| Benzidine | 2.85 |
| 4,4'-diamino-diphenyl ether | 3.29 |

[4] 0.5% in N,N-dimethylacetamide at 30° C.

Each polyamide-acid is cast into a film, which is dried partially by heating at 100° C. for about 10 minutes and then immersed in a 1 mole solution of trifluoroacetic anhydride in benzene at room temperature until cyclization is complete. The properties of these 4 polyiminolactone films (designated CD, PPD, PP and POP, respectively) are as follows:

| | CD | PPD | PP | POP |
|---|---|---|---|---|
| Inherent viscosity | [1] 0.48 | [2] 0.23 | [2] 0.57 | [2] 0.31 |
| Color | | ([3]) | ([4]) | |
| Modulus (K p.s.i.): | | | | |
| 23° C | | 596 | 579 | 276 |
| 105° C | | 673 | 621 | 257 |
| Elongation (percent): | | | | |
| 23° C | | 12.2 | 9.5 | 3.7 |
| 105° C | | 2.8 | 3.3 | 2.7 |
| Tensile (K p.s.i.): | | | | |
| 23° C | | 14.7 | 14.8 | 7.9 |
| 105° C | | 12.7 | 13.0 | 6.4 |
| Impact (kg.-cm./mil) | 0.02 | 1.38 | 1.25 | 0.19 |
| Tear strength (g./mil) | | 2.9 | 6.1 | 8.7 |
| Density (g./cm.³) | 1.303 | 1.413 | 1.351 | 1.353 |
| Pinhole flex life (23° C.) | | 427 | 1252 | 1662 |
| Zero strength temp. (° C.) | 426±10 | 758±5 | 840±25 | 732±10 |
| Volume resistivity (ohm-cm.): | | | | |
| 23° C | $4.7 \times 10^{10}$ | $2.1 \times 10^{11}$ | $1.4 \times 10^{12}$ | $2.6 \times 10^{12}$ |
| 100° C | $5.4 \times 10^{10}$ | $1.6 \times 10^{11}$ | $1.4 \times 10^{12}$ | |

[1] 0.5% in N,N-dimethylacetamide.
[2] 0.5% in sulfuric acid.
[3] Deep yellow.
[4] Deep orange.

The latter three polyiminolactones have very high thermal stabilities, and all four have surprisingly high electrical conductivities, making them useful in some commercial applications where low conductance is needed.

Example 22

A sample of a polyiminolactone film of pyromellitic dianhydride and 4,4'-diamino-diphenyl ether is placed in an oven at room temperature. The oven is heated slowly to 300° C., which temperature is maintained for one hour. The infrared spectrum of a sample of this film indicates that isomerization of the iminolactone structure to normal-imide structure occurs. The final absorption at 5.55 microns and 10.9 microns is minimal while absorption at 13.8 microns is strong.

Another sample of the polyiminolactone film, heated at 250° C. for 23 hours and examined by infrared, provides similar results.

Example 23

A deep orange polyiminolactone film is prepared by casting a polyamide-acid film of pyromellitic dianhydride and 4,4'-diamino-diphenyl ether onto a glass plate; drying 1.5 minutes at 100° C.; immersing in a 1 molar trifluoroacetic anhydride solution in benzene for 1 hour at room temperature; washing in benzene; and then drying under vacuum.

Samples of the polyiminolactone film are converted to polyiminolactone/polyimide copolymers of compositions varying from 5–95 mole percent by immersing the samples in a N,N'-dimethylformamide solution of 0.1 molar triethylammonium acetate. By removing the films from solution at various times and leaching out the triethylammonium acetate with fresh solvent, the isomerization is inhibited. Measurement of normal-imide absorbance at 13.85 microns relative to absorbance at 10.85 microns shows the extent of isomerization.

| Immersion time | Final Color of Film | Characterization by Infrared Spectra | |
|---|---|---|---|
| | | n-Imide | Iminolactone |
| Original | Orange | Less than 2% | Very strong. |
| 1 minute | Medium yellow | Strong | Trace. |
| 30 minutes | Pale yellow | do | Less than 2%. |
| 19 hours | Very light yellow | do | |

What is claimed is:
1. A process for preparing polyiminolactone which comprises treating a polyamide-acid consisting essentially of recurring units of the formula:

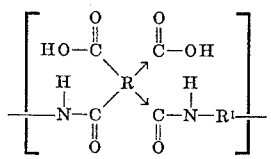

wherein the arrows denote isomerism;

R is an aromatic tetravalent organic radical selected from the group consisting of

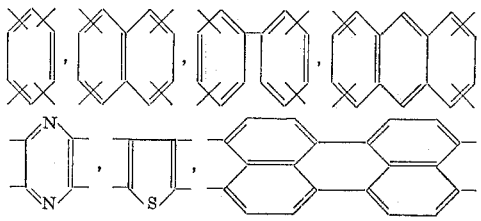

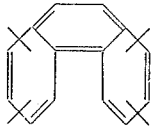

and

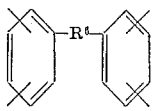

where $R^6$ is selected from the group consisting of an alkylene chain of 1–3 carbon atoms,

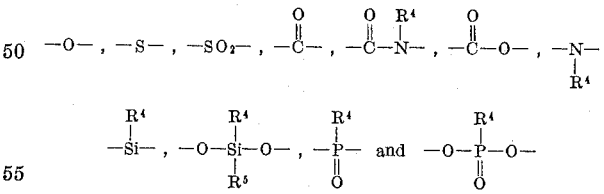

where $R^4$ and $R^5$ are selected from the group consisting of alkyl and aryl; and $R^1$ is arylene; said polyamide-acid having an inherent viscosity of at least 0.1 as measured at 30° C. on a 0.5% by weight solution in N,N-dimethylacetamide;

with a compound selected from the group consisting of lower fatty acid halides, halogenated lower fatty acid halides, halogenated lower fatty acid anhydrides, aryl phosphonic halides and thionyl halides, to form a polyiminolactone consisting essentially of recurring units of the formula

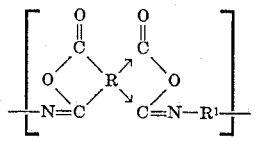

wherein the arrows denote isomerism; and
R and R¹ have the same meaning as above.

2. A process as in claim 1 wherein said compound is selected from the group consisting of trifluoroacetic anhydride, phenyl phosphonic dichloride, chloroacetic anhydride, acetyl chloride, propionyl fluoride, valeryl chloride, bromoacetyl bromide, and thionyl chloride.

References Cited by the Examiner
UNITED STATES PATENTS
3,179,633   4/1965   Endrey _____ 260—78

WILLIAM H. SHORT, *Primary Examiner.*
H. D. ANDERSON, *Assistant Examiner.*